(12) United States Patent
Park et al.

(10) Patent No.: US 12,389,271 B2
(45) Date of Patent: Aug. 12, 2025

(54) METHOD AND DEVICE FOR PROVIDING SPLIT COMPUTING SERVICE IN WIRELESS COMMUNICATIONS SYSTEM

(71) Applicant: Samsung Electronics Co., Ltd., Suwon-si (KR)

(72) Inventors: Jungshin Park, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/979,300

(22) Filed: Nov. 2, 2022

(65) Prior Publication Data
US 2023/0143458 A1    May 11, 2023

(30) Foreign Application Priority Data
Nov. 5, 2021    (KR) .......................... 10-2021-0151756

(51) Int. Cl.
*H04W 28/08* (2023.01)
*H04W 28/02* (2009.01)
(Continued)

(52) U.S. Cl.
CPC ....... *H04W 28/08* (2013.01); *H04W 28/0268* (2013.01); *H04W 76/11* (2018.02); *H04W 80/10* (2013.01)

(58) Field of Classification Search
CPC . H04W 28/08; H04W 28/0268; H04W 76/11; H04W 80/10; H04W 28/0925;
(Continued)

(56) References Cited

U.S. PATENT DOCUMENTS

2020/0112921 A1    4/2020  Han et al.
2020/0154350 A1    5/2020  Dao et al.
(Continued)

FOREIGN PATENT DOCUMENTS

CN    112840693 A    5/2021
WO    2021/066341 A1    4/2021

OTHER PUBLICATIONS

3rd Generation Partnership Project; Technical Specification Group Services and System Aspects; Study on traffic characteristics and performance requirements for AI/ML model transfer in 5GS (Release 18), 3GPP TR 22.874 V18.1.0, sections 5.5-5.5.6, Sep. 24, 2021.
(Continued)

*Primary Examiner* — Abdullahi Ahmed
(74) *Attorney, Agent, or Firm* — Jefferson IP Law, LLP

(57) ABSTRACT

The disclosure relates to a method and device for efficiently providing a split computing service in a wireless communication system. In accordance with an aspect of the disclosure, a method performed by a session management function (SMF) in a wireless communication system supporting split computing is provided, the method comprises receiving, via a first network entity from an application server, quality of service (QoS) related information to be applied to a user equipment (UE) for the split computing, the first network entity being either a policy control function (PCF) or a user data management (UDM), and transmitting, to the UE via a network, the QoS related information for the split computing in a session establishment procedure for the UE.

17 Claims, 7 Drawing Sheets

(51) Int. Cl.
*H04W 76/11* (2018.01)
*H04W 80/10* (2009.01)

(58) Field of Classification Search
CPC .............. H04W 28/0967; H04W 88/14; H04L 41/0894; H04L 41/5019; H04L 67/10; H04L 67/61
See application file for complete search history.

(56) References Cited

U.S. PATENT DOCUMENTS

| | | | |
|---|---|---|---|
| 2020/0267785 A1* | 8/2020 | Talebi Fard | ............ H04L 45/04 |
| 2020/0272896 A1 | 8/2020 | Wei et al. | |
| 2020/0404538 A1 | 12/2020 | Zhu et al. | |
| 2021/0076250 A1 | 3/2021 | Wang et al. | |
| 2022/0393839 A1 | 12/2022 | Jung et al. | |
| 2023/0019215 A1* | 1/2023 | Wang | ....................... H04L 47/24 |
| 2023/0247418 A1* | 8/2023 | Sun | ......................... H04W 8/24 370/328 |
| 2023/0337043 A1* | 10/2023 | Pateromichelakis | ........................ H04W 28/0263 |
| 2023/0345292 A1* | 10/2023 | Pateromichelakis | ........................ H04W 28/0268 |
| 2024/0171522 A1* | 5/2024 | Li | ..................... H04W 28/0268 |

OTHER PUBLICATIONS

International Search Report dated Feb. 14, 2023, issued in International Application No. PCT/KR2022/016992.
European Search Report dated Feb. 3, 2025, issued in European Application No. 22890352.2.

* cited by examiner

METHOD AND DEVICE FOR PROVIDING SPLIT COMPUTING SERVICE IN WIRELESS COMMUNICATIONS SYSTEM

CROSS-REFERENCE TO RELATED APPLICATION(S)

This application is based on and claims priority under 35 U.S.C. § 119(a) of a Korean patent application number 10-2021-0151756, filed on Nov. 5, 2021, in the Korean Intellectual Property Office, the disclosure of which is incorporated by reference herein its entirety.

BACKGROUND

1. Field

The disclosure relates to a method and device for providing split computing to a user equipment (UE) in a wireless communication system.

2. Description of Related Art

Fifth-generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth-generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input-multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

For a UE and a network server to support a split computing service for, e.g., an AI/ML application using a wireless communication system, information about variations in network and communication resources of the wireless communication system is required. When information about the variation in the resource allocated to the session for communication is not provided, the performance of split computing may be drastically deteriorated or may not be operated.

Aspects of the disclosure are to address at least the above-mentioned problems and/or disadvantages and to provide at least the advantages described below. Accordingly, an aspect of the disclosure is to provide a method and device for efficiently providing a split computing service in a wireless communication system.

Another aspect of the disclosure is to provide a method and device for providing session state information related to split computing to a UE and an application server in a wireless communication system.

Additional aspects will be set forth in part in the description which follows and, in part, will be apparent from the description, or may be learned by practice of the presented embodiments.

In accordance with an aspect of the disclosure, a method performed by a session management function (SMF) in a wireless communication system supporting split computing is provided. The method includes receiving, via a first network entity from an application server, quality of service (QoS) related information to be applied to a user equipment (UE) for the split computing, the first network entity being either a policy control function (PCF) or a user data management (UDM), and transmitting, to the UE via a network, the QoS related information for the split computing in a session establishment procedure for the UE.

In accordance with another aspect of the disclosure, a method performed by a UE in a wireless communication system supporting split computing is provided. The method includes transmitting, to a SMF via a network, a PDU session establishment request message including a PDU session ID, and receiving, via the network from the SMF, a PDU session establishment response message including QoS related information to be applied to the UE for the split computing.

In accordance with another aspect of the disclosure, a session management function (SMF) in a wireless communication system supporting split computing is provided. The SMF includes a transceiver, and a processor coupled with the transceiver and configured to receive, via a first network entity from an application server, QoS related information to be applied to a UE for the split computing, the first network entity being either a PCF or a UDM, and transmit, to the UE via a network, the QoS related information for the split computing in a session establishment procedure for the UE.

In accordance with another aspect of the disclosure, a user equipment (UE) in a wireless communication system supporting split computing is provided. The UE includes a transceiver, and a processor coupled with the transceiver and configured to transmit, to a SMF via a network, a PDU session establishment request message including a PDU session ID, and receive, via the network from the SMF, a PDU session establishment response message including QoS related information to be applied to the UE for the split computing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
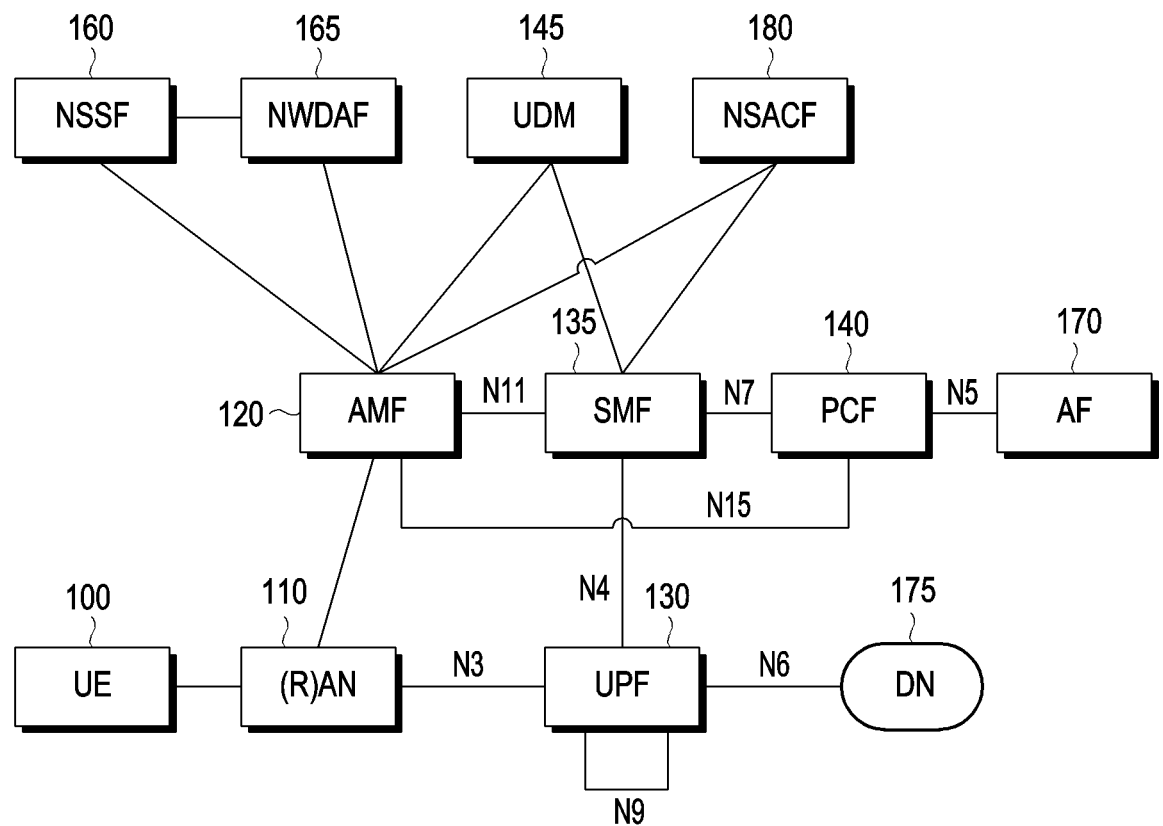
FIG. 1 is a view illustrating a system structure of a 5GS according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

Those skilled in the art will understand that, unless specifically stated otherwise, the singular forms "a", "an" and "the" may include plural forms. It should be further understood that the word "comprise" and "include" used in the specification of the disclosure refers to the presence of the described features, integers, steps, operations, elements and/or components, but does not exclude the presence or addition of one or more other features, integers, steps, operations, elements, components, and/or combinations thereof. It should be understood that when an element is referred to as being "connected" or "coupled" to another element, it can be directly connected or coupled to the other element, or intermediate elements may also be present. Furthermore, "connected" or "coupled" as used herein may include wirelessly connected or wirelessly coupled.

The phrase "at least one of," when used with a list of items, may refer, for example, to different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" may refer, for example, to one or more. Accordingly, a set of items can be a single item or a collection of two or more items. As used herein, the term "and/or" includes all or any of the elements and all combinations of one or more of the associated listed items.

The disclosure relates to a method and device for supporting various services in a wireless communication system. Specifically, the disclosure describes a technique for supporting a performance enhancement in split computing by providing required state information and managing a request for communication session information received from a UE and an application server using split computing in a context where, e.g., an AI/ML application is serviced through split computing in a wireless communication system.

An example network requiring split computing is described. When the network provides an artificial intelligence (AI)-based application service (e.g., connected car or voice/image recognition) to the UE, device-based machine learning (ML) training/inference may be expected to be used for both performance optimization in the network area and AI-based services in the application area. The data for an AI-based service may require different quality-of-service (QoS) processing than that of Internet traffic. Data according to the ML training/inference may be fed back from the UE, performing ML training/inference, to the network. To that end, required is a method for distributing the computing loads between the application server and the UE using split computing. Further, split computing may be required for, e.g., efficient split scheduling between UE and edge cloud network in the edge cloud network using edge computing, precise profiling of computing resources and network resources, and efficient data transmission through network.

As used herein, terms for identifying access nodes, terms denoting network entities or network functions (NFs), terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

For ease of description, the terms and names defined in the 3rd generation partnership project long term evolution (3GPP LTE) and/or 5G standards may be used herein. However, the disclosure is not limited by such terms and names and may be likewise applicable to systems conforming to other standards.

For convenience of description, for the entities that exchange information to control access and manage the state in the wireless communication system, the terms of the network functions (NFs) (e.g., access and mobility management function (AMF), session management function (SMF), and network slice selection function (NSSF)) are used. However, the embodiments of the disclosure may be likewise applied even when the NF is actually implemented as an instance (e.g., an AMF instance, SMF Instance, or NSSF Instance).

FIG. 1 illustrates a system structure of a 5GS according to an embodiment of the disclosure.

A 5GS may include a 5G core network, a base station, and a UE. The 5G core network may include an AMF 120, an SMF 135, a UPF 130, a policy control function (PCF) 140, a user data management (UDM) 145, an NSSF 160, a network data analytics function (NWDAF) 165, an application function (AF) 170, a non-3GPP function (N3F), and may connect to a data network (DN) 175.

The UE 100 may access the 5G core network through the base station 110 which is a radio access network (RAN). The base station 110 may support the 3GPP access network (e.g., NR, E-UTRA) or the non-3GPP access network (e.g., Wi-Fi) type. The UE 100 may include a terminal, a mobile station (MS), a cellular phone, a smartphone, a computer, or various devices capable of performing a communication function, be connected via the base station 110 and the N2 interface with the AMF 120, and be connected with the UPF 130 via the N3 interface. The base station 110 may be denoted by other terms, such as an 'access point (AP)', an 'eNodeB (eNB)', a '5th generation (5G) node', a 'gNodeB (gNB),' or other various terms with an equivalent technical meaning thereto. The base station may be a network entity including at least one of an integrated access and backhaul-donor (IAB-donor), which is a gNB providing network access to UE(s) through a network of backhaul and access links in the NR system, and an IAB-node, which is a radio access network (RAN) node supporting NR backhaul links to the IAB-donor or another IAB-node and supporting NR access link(s) to UE(s). The N3F is a network function (NF) that operates as a termination of the N2 interface and N3 interface for the UE 100 having gained access through an access network not defined by the 3GPP (e.g., non-3GPP access network (e.g., Wi-Fi)). The N3F may process N2 control plane signaling and N3 user plane packets.

Referring to FIG. 1, the access and mobility management function (AMF) 120 is a network function (NF) that manages radio network access and mobility for the UE and processes control plane information. The session management function (SMF) 135 is an NF that manages the session for the UE. The session information may include quality of service (QoS) information, billing information, and information about packet processing. The user plane function (UPF) 130 is an NF processing user traffic (user plane traffic) and is controlled by the SMF 135. The policy control function (PCF) 140 is an NF that manages operator policy for providing a service in the wireless communication system. The user data management (UDM) 145 is an NF that stores and manages UE subscription information. The unified data repository (UDR) is an NF that stores and manages data. The UDR may store the UE subscription information and may provide the UDM 145 with the UE subscription information. Further, the UDR may store operator policy information and may provide operator policy information to the PCF 140. The network data analytics function (NWDAF) 165 is an NF that provides analysis information for operating the 5G system. The NWDAF 165 may gather data from other NFs or operations, administration and maintenance (OAM) constituting the 5G system, analyze the gathered data, and provide the result of analysis to other NFs. The network slice admission control function (NSACF) 180 is an NF that monitors and controls the number of sessions and the number of UEs of the network slice, as the target for network slice admission control (NSAC). The NSACF stores configuration information about the maximum number of UEs and the maximum number of sessions per network slice. The 5G system supporting network slicing may allocate network resources suitable for a specific service for each network slice or for each set of network slices. Network slicing may be understood as technology for logically configuring a network with a set of network functions (NF) to support various services with different characteristics, such as broadband communication services, massive IoT, V2X, or other mission critical services, and separating different network slices. A network resource may mean a network function (NF) or logical resource provided by the NF or radio resource allocation of a base station. For example, a communication carrier may configure network slice A for providing a mobile broadband service, network slice B for providing a vehicle communication service, and network slice C for providing an IoT service. The 5G system may efficiently provide a corresponding service to a UE through a specialized network slice suited for the characteristics of each service. In the 5G system, traffic for different network slices may be processed by different protocol data unit (PDU) sessions. The PDU session may mean an association between a data network providing a PDU connection service and a UE. Therefore, even when a communication failure occurs in one network slice, communication in other network slices is not affected, so that it is possible to provide a stable communication service.

Hereinafter, for convenience of description, entities for exchanging information for access control and state management will be collectively referred to as NFs. However, the embodiments of the disclosure may be likewise applied even when the NF is actually implemented as an instance (e.g., an AMF instance, SMF Instance, or NSSF Instance).

In the disclosure, instance may refer to a state in which a specific NF exists in the form of a software code and is executable by being assigned a physical or/and logical resource from a physical computing system, e.g., a specific computing system present on a core network, to perform the function of the NF. Therefore, AMF instance, SMF instance, and NSSF instance may mean when a physical and/or logical resource is assigned from a specific computing system present on a core network to perform the AMF, SMF, and NSSF operation, respectively. As a result, the AMF instance, SMF instance, and NSSF instance which receive and use a physical and/or logical resource from a specific computing system present on a network may perform the same operations as when there a physical AMF, SMF, and NSSF device exists. Therefore, in describing embodiments of the disclosure, NF (AMF, SMF, UPF, NSSF, network repository function (NRF), or service communication proxy (SCP)) may be replaced with NF instance or, conversely, NF instance may be replaced with NF. Similarly, in describing embodiments of the disclosure, network slice may be replaced with network slice instance, or network slice instance may be replaced with network slice.

According to an embodiment of the disclosure, in the 5G system defined by the 3GPP, one network slice may be referred to as single-network slice selection assistance information (S-NSSAI). The S-NSSAI may include a slice/service type (SST) value and a slice differentiator (SD) value. The SST may indicate the characteristics of the service supported by the slice (e.g., enhanced mobile broadband (eMBB), IoT, ultra-reliability low latency communication (URLLC), V2X, etc.). The SD may be a value used as an additional identifier for a specific service referred to as SST.

The NSSAI may be constituted of one or more S-NSSAIs. Examples of the NSSAI may include the configured NSSAI stored in the UE, the requested NSSAI requested by the UE, the allowed NSSAI allowed for use by the UE determined by the NF (e.g., AMF or NSSF) of the 5G core network, and the subscribed NSSAI subscribed by the UE, but are not limited thereto.

The UE 100 may simultaneously be connected to the access network 110 to register with the 5G system. For example, the UE 100 may access the base station 110 to perform a UE registration procedure with the AMF 120. During the registration procedure, the AMF 120 may determine an allowed NSSAI available to the UE 100 connected to the base station 110 and allocate it to the UE 100. The UE 100 may select a specific slice and set up a PDU session for actual communication with the application server. One PDU session may include one or more QoS flows, and each QoS flow may set a different quality-of-service (QoS) parameter to provide a different transmission performance required for each application service.

Figure 2:
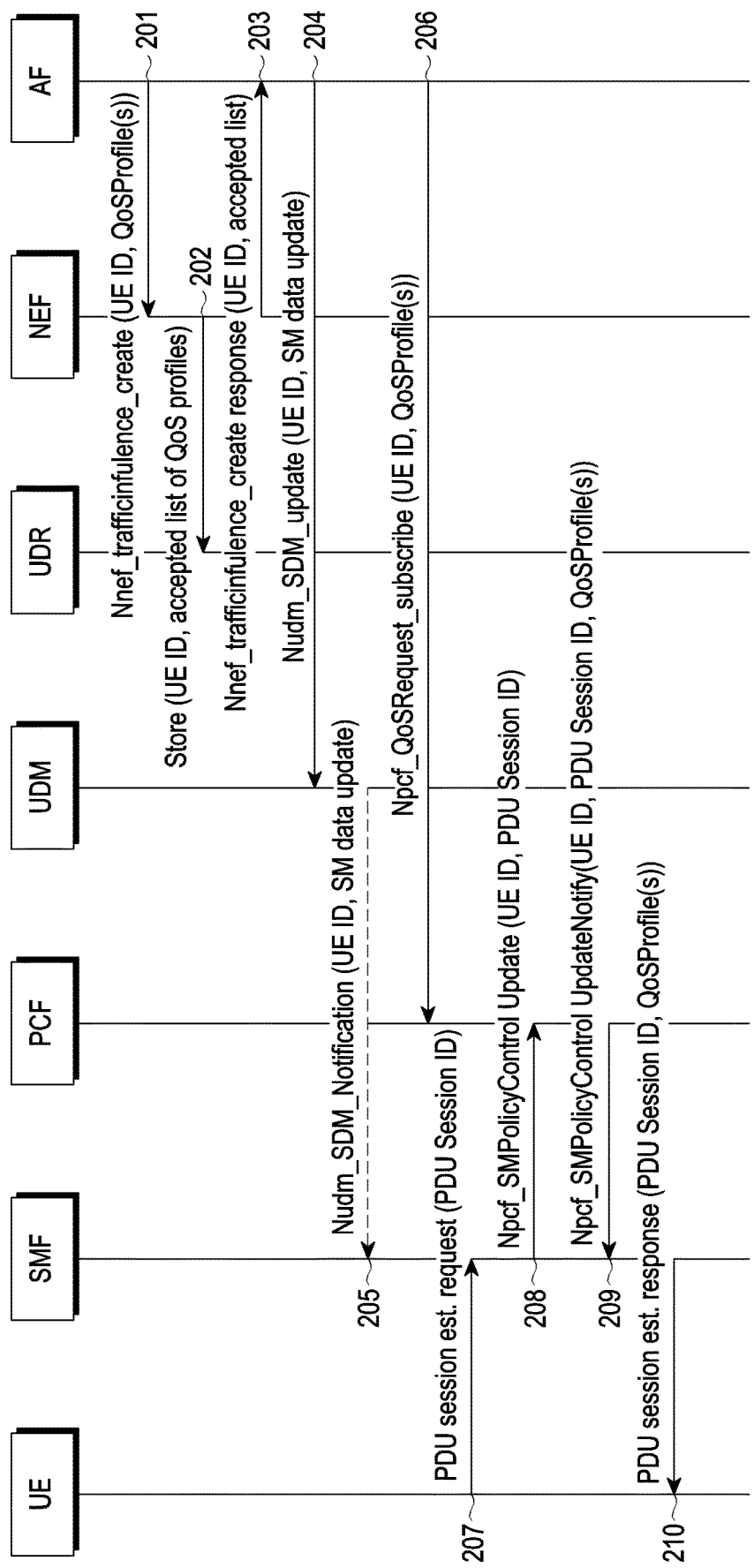
FIG. 2 is a view illustrating a session establishment procedure to which a QoS profile(s) for split computing is applied in a wireless communication system according to an embodiment of the disclosure.
Figure 3:
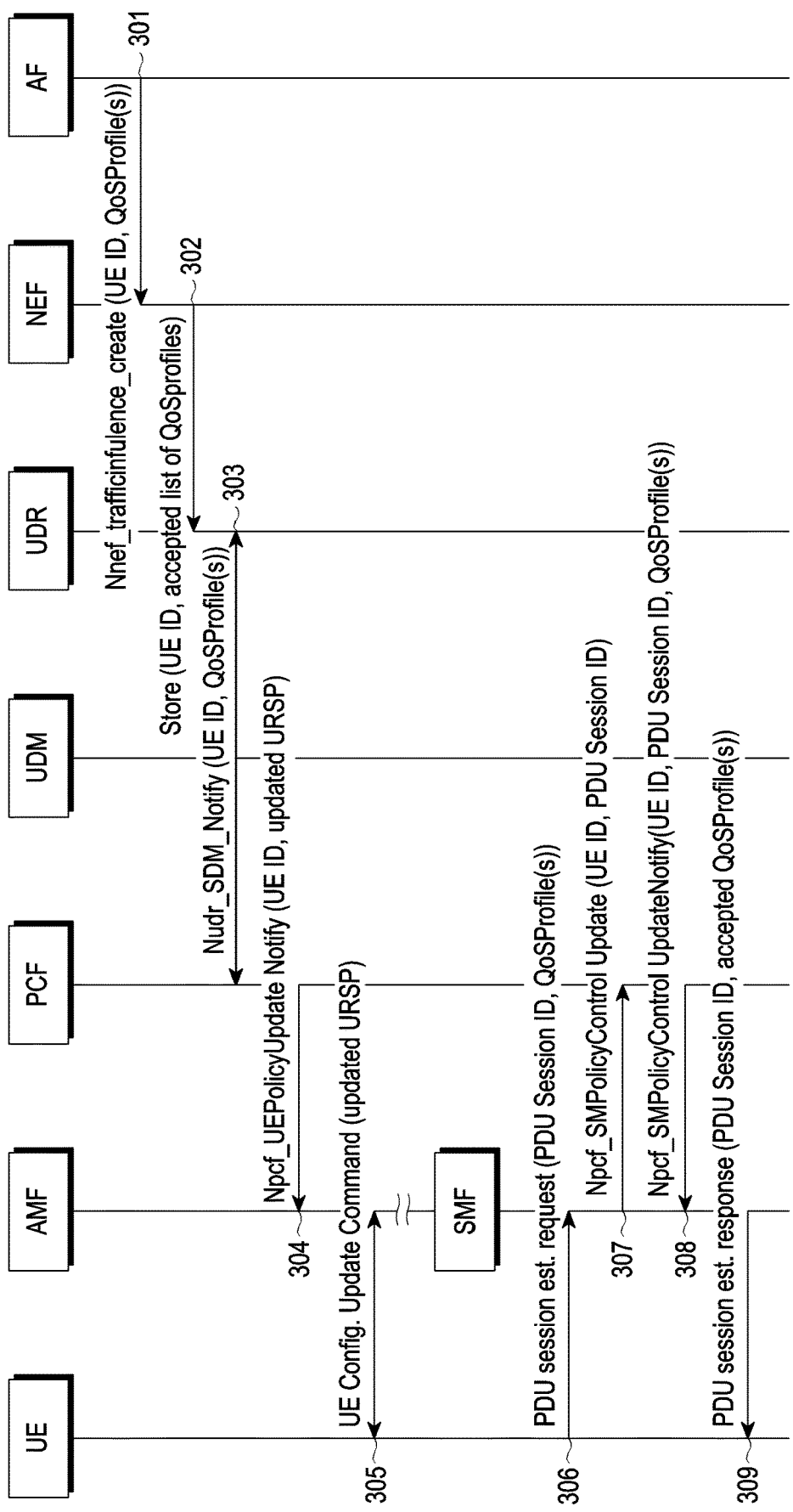
FIG. 3 is a view illustrating a session establishment procedure to which a QoS profile(s) for split computing is applied in a wireless communication system according to an embodiment of the disclosure.
Figure 4:
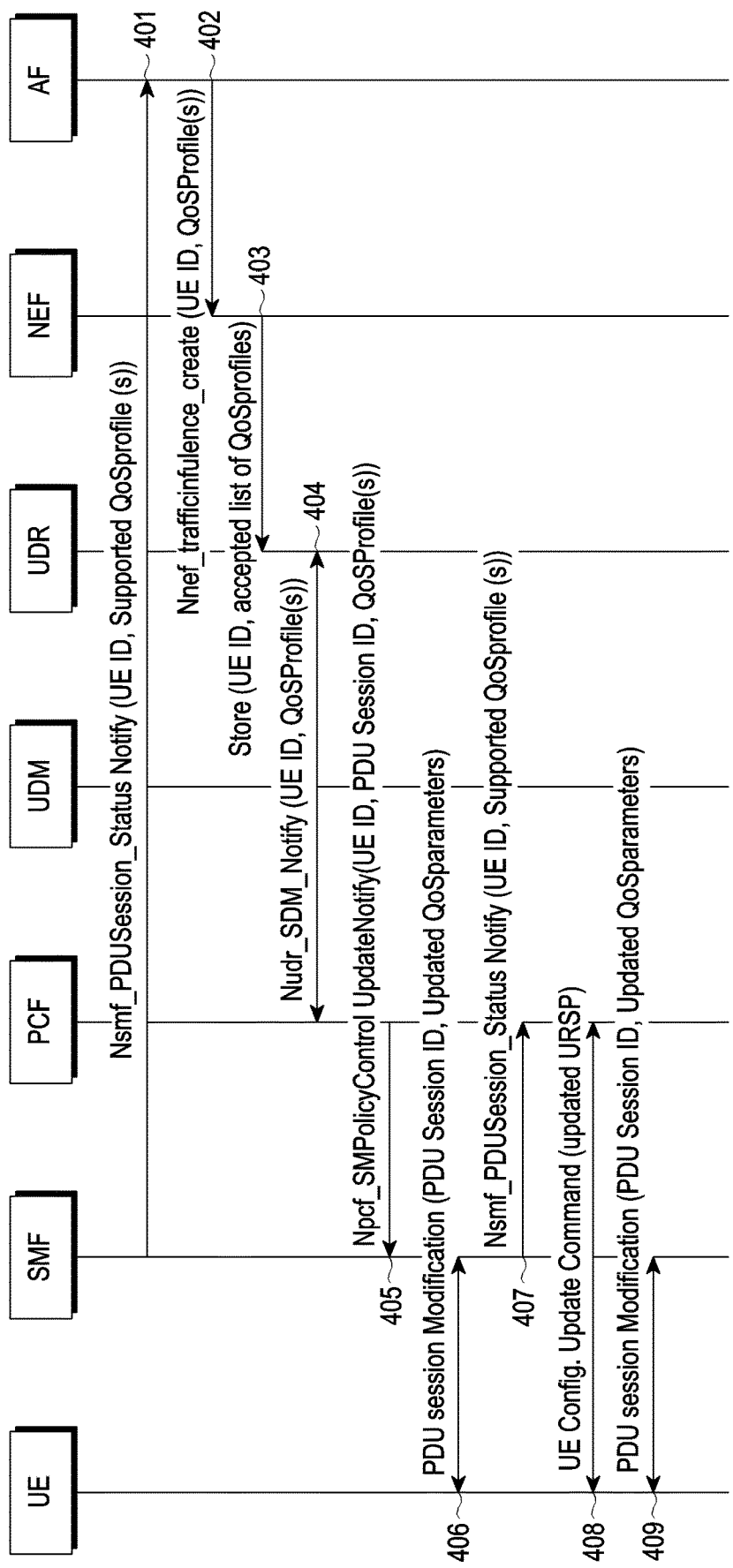
FIG. 4 is a view illustrating a session change procedure to which a QoS profile(s) for split computing is applied in a wireless communication system according to an embodiment of the disclosure.

In the embodiments of FIGS. 2 to 4, for the default definitions or descriptions of the NFs, the description made above in connection with FIG. 1 may be referenced. For the default definitions or descriptions of the messages transmitted/received between the NFs, the 3GPP standards TS 23.501 and TS 23.502 may be referenced. In the following embodiments of the disclosure, the application server (or AF) and UE may support AI/ML-based application services. The QoS profile(s) for split computing may be applied to distribute the computing loads between the application server (or AF) and the UE which use AI/ML-based application services.

FIG. 2 illustrates a session establishment procedure to which a QoS profile(s) for split computing is applied in a wireless communication system according to an embodiment of the disclosure.

Although different example schemes a) to c) for applying QoS profile(s) for split computing are shown as one figure, FIG. 2, for convenience of description, the schemes a) to c) may be selectively performed.

a) Scheme of providing the QoS profile(s) for split computing from the application server (or AF) to the SMF through the UDM and applying them,
b) Scheme of providing the QoS profile(s) for split computing from the application server (or AF) to the SMF through the PCF and applying them, or
c) Scheme of providing QoS profile(s) for split computing from the UE, requesting PDU session establishment, to the SMF and applying them.

Referring to FIG. 2, according to an embodiment of the disclosure, the application server (although exemplified as an application function (AF) in the embodiment of FIG. 2, a separate server may also request to perform the operation through the AF of the wireless communication system) may transmit QoS property information about the session to be used for the UE's split computing application service to the UDR through the network exposure function (NEF) of the wireless communication system and, when the QoS of the session is changed, request the UE or AF to feed back the changed QoS.

Through the Nnef_TrafficInfluence_Create message in operation 201, the AF transmits, to the NEF, at least one of one or more QoS profiles designating the service quality information required for the application service, application ID (or traffic filter information available to identify application traffic), and UE identifier (ID) of the UE to use the split computing application service. Each QoS profile may designate the service quality parameter required with respect to each distribution point distributing the computing loads between the application server and the UE, use in split computing. For example, there may be included each QoS profile for designating traffic quality requirements for distributing the loads by 1:9 between the UE and the application server or designating traffic quality requirements necessary for distributing by another distribution point, e.g., 9:1.

In operation 202, the NEF may select QoS profile(s) allowed for the requesting AF and transmit a store message including session property information, including at least one of the AF ID, UE ID, application ID, and accepted QoS profile(s), to the UDR so that the session property information may be used when creating a session with the UE in the future.

In operation 203, in response to the Nnef_TrafficInfluence_Create message of operation 201, the NEF transmits, to the AF, an Nnef_TrafficInfluence_Create response message including the QoS profile information (e.g., the accepted list of QoS profile(s)) successfully stored in the UDR for the QoS profile requested by the AF to apply the UE's session.

Operation 204 is another embodiment of operations 201 to 203. The AF may transmit an Nudm_SDM_update message including an SM data update, including, e.g., the QoS profile to be applied to the UE, for AFs reliable to the wireless communication system, to the UDM directly or via the NEF.

In operation 205, upon being notified that among the subscription information about the UE, the session policy has been changed due to application of the QoS profile received from the AF for a specific UE, by the UDR in operation 202 (not shown) or upon receiving a request to apply toe QoS profile for a specific UE directly from the AF in operation 204, the UDM may transmit an Nudm_SDM_Notification message including the new session policy (e.g., an SM data update) to be applied to the UE to the SMF. The new session policy may include at least one of QoS profile information to be applied to the UE and the application ID (or traffic filter) corresponding to the AF ID.

Operation 206 is another embodiment of operations 201 through operation 205 of scheme a) which uses the UDM in the transfer path of the QoS profile(s) for split computing and corresponds to scheme b) which uses the PCF in the transfer path of QoS profile(s) for split computing. In operation 206, the AF transfers an Npcf_QoSRequest_subscribe message including the QoS profile(s) information to be applied to the UE, to the PCF (directly or via the NEF and UDR). Specifically, the AF may transmit, to the NEF, an Npcf_QoSRequest_subscribe message including at least one of one or more QoS profiles designating the service quality information required for the application service, application ID (or traffic filter information available to identify application traffic), and UE identifier (ID) of the UE to use the split computing application service.

In operation 207, the UE transmits a PDU session establishment request message including the PDU session ID to the SMF to request to establish a session. Meanwhile, as another embodiment, when the UE has a QoS profile(s) directly received from the application server through the application message in the process of requesting session establishment from the SMF in operation 207, the UE may transmit, to the SMF, a PDU session establishment request message including the QoS profile(s) corresponding to each distribution point to be used for the split computing application service, instead of the application server (AF) (scheme c). In this case, to indicate that the PDU session is session establishment for split computing, the UE may include a predesignated, separate indicator in the PDU session establishment request message or may indirectly indicate it by including traffic filter information about the split computing application service in the PDU session establishment request message.

In operation 208, to identify the session policy to be applied to the PDU session requested by the UE in operation 207, the SMF may transfer, to the PCF, an Npcf_SMPolicyControl_Update message including at least one of the UE ID, the application ID (or traffic filter) received from the UE, and QoS profile(s) information to receive session policy information (e.g., the QoS profile(s) information to be applied to the UE) from the PCF (scheme b). As another embodiment, when having already received the session policy information to be applied to split computing from the UDM through operation 205 (scheme a), the SMF may transfer an Npcf_SMPolicyControl_Update message including the session policy information to the PCF or the SMF itself may apply the session policy information in operation 208.

In operation 209, upon receiving the QoS profile(s) to be applied to each distribution point of split computing from the AF through operation 206, the PCF may set session policy information to which it has been applied and transfer an Npcf_SMPolicyControl_UpdateNotify message including the QoS profile(s) to the SMF. Meanwhile, when the PCF fails to receive the QoS profile(s) information from the AF through operation 206 but receives the QoS profile(s) information via the SMF from the UE through operations 207 and 208, the PCF may determine whether each QoS profile requested by the UE has the allowable service quality in the UE's subscription information, set session policy information constituted of allowed QoS profile(s), and transfer an Npcf_SMPolicyControl_UpdateNotify message including the set session policy information to the SMF.

Thereafter, in operation 210, the SMF applies the session policy received from the PCF through operation 209 or the session policy received from the UDM through operation 205 to determine the QoS profile(s) to be applied to the PDU session requested by the UE, and transmits a PDU session establishment response message including the determined QoS profile(s) to the UE. When the UE includes the QoS profiles for split computing in the PDU session create request message in the process of creating a session and transmits it to the SMF, the SMF may store an internal indicator for transferring session change information along with the QoS profile(s) requested by the UE for the corresponding session to notify the UE when the QoS of the session is changed.

FIG. 3 illustrates a session establishment procedure to which a QoS profile(s) for split computing is applied in a wireless communication system according to an embodiment of the disclosure.

Referring to FIG. 3, a scheme in which a QoS profile(s) for split computing is transferred from the application server (or AF) to the PCF, the URSP updated based on the QoS profile(s) is provided from the PCF to the UE through the AMF of the control plane, and when the UE requests PDU session establishment, the QoS profile(s) based on the updated URSP is provided and applied to the SMF.

Referring to FIG. 3, the UE and application server (although exemplified as an AF in the embodiment of FIG. 3, a separate server may also request to perform the operation through the AF of the wireless communication system) may transmit QoS property information about the session to be used for the UE's split computing application service to the UDR through the NEF of the wireless communication system and, when the QoS of the session is changed, request the UE or AF to feed back the changed QoS.

Through the Nnef_TrafficInfluence_Create message in operation 301, the AF transmits, to the NEF, at least one of one or more QoS profiles designating the service quality information required for the application service, application ID (or traffic filter information available to identify application traffic), and UE identifier (ID) of the UE to use the split computing application service. Each QoS profile may designate the service quality parameter required with respect to each distribution point distributing the computing loads between the application server and the UE, use in split computing. For example, there may be included each QoS profile for designating traffic quality requirements for distributing the loads by 1:9 between the UE and the application server or designating traffic quality requirements necessary for distributing by another distribution point, e.g., 9:1.

In operation 302, the NEF selects the QoS profile(s) allowed for the requesting AF, transmits a store message including session property information, including at least one of the AF ID, UE ID, application ID, and accepted QoS profile(s), to the UDR, and stores the session property information in the UDR to be used in creating a session with the UE in the future.

In operation 303, the UDR notifies the PCF that the subscription information about the UE has been changed by the AF's request. The Nudr_SDM_Notify message transmitted by the UDR to the PCF includes at least one of one or more QoS profiles designating the service quality information required for the application service, application ID (or traffic filter information available to identify application traffic), and UE identifier (ID) of the UE received from the AF.

In operation 304, the PCF may determine (update) the UE's new UE route selection policy (URSP) to which the QoS profile(s) requested by the AF has been applied, received in operation 303, and transmit an Npcf_UEPolicyUpdate_Notify message including the updated URSP to the AMF to provide it to the UE. The updated URSP may include the application ID (or traffic filter) and the QoS profile information.

In operation 305, the AMF transmits a UE configuration update command including the updated URSP, received from the PCF, to the UE.

In operation 306, the UE may apply the updated URSP, received from the network in the process of operation 305, performing the operation of internally selecting the session to be used for data transmission of the application using split computing. In this case, if the session to which the QoS profile(s) requested by the AF in operation 301 has not currently been created through the updated URSP, the UE may apply the updated URSP in operation 306 to perform the operation of requesting the network to establish a new PDU session to be used for data transmission of the split computing application. To that end, the UE transmits a PDU session establishment request message including the QoS profile(s) based on the updated URSP, requesting session establishment. The QoS profile(s) may be information corresponding to each distribution point to be used for the split computing application service instead of the application server. Further, to indicate that the PDU session is session establishment for split computing, the UE may include a predesignated separate indicator in the PDU session establishment request message or may indirectly indicate that it is session establishment for split computing by including the traffic filter information of the split computing application service in the PDU session establishment request message.

In operation 307, to identify, through the PCF, the session policy to be applied to the PDU session requested by the UE, the SMF may transfer, to the PCF, an Npcf_SMPolicyControl_Update message including at least one of the UE ID, the application ID (or traffic filter) received from the UE, and QoS profile(s) information to request session policy information from the PCF. Meanwhile, if the UDM has already transferred, to the SMF, the changed subscription information including the session policy information to be applied to split computing, due to the subscription information update in the process in which the session policy information to be applied to split computing is changed so that the subscription information about the UDR is updated, the SMF may transfer, to the PCF, an Npcf_SMPolicyControl_Update message including the session policy information, or the SMF itself may apply the session policy information.

In operation 308, upon receiving the QoS profile(s) to be applied to each distribution point of split computing in operation 303, the PCF may set a session policy designating the QoS to be applied to the session using the received QoS profile(s) information and transfer it to the SMF through the Npcf_SMPolicyControl_UpdateNotify message. Meanwhile, when the PCF fails to receive the QoS profile(s) information from the AF through operation 303 but receives the QoS profile(s) information via the SMF from the UE through operations 306 and 307, the PCF may determine whether each QoS profile requested by the UE has the allowable service quality in the UE's subscription information, set session policy information constituted of allowed QoS profile(s), and transfer an Npcf_SMPolicyControl_UpdateNotify message including the set session policy information to the SMF.

In operation 309, the SMF applies the session policy received from the PCF through operation 308 to determine the QoS profile(s) to be applied to the session requested by the UE, and transmits a PDU session establishment response message including the determined QoS profile(s) to the UE. When the UE includes the QoS profiles for split computing in the PDU session create request message in the process of creating a session and transmits it to the SMF, the SMF may store an internal indicator for transferring session change information along with the QoS profile(s) requested by the UE for the corresponding session to notify the UE when the QoS of the session is changed.

FIG. 4 illustrates a session change (SessionModification) procedure to which a QoS profiles for split computing are applied in a wireless communication system according to an embodiment of the disclosure.

Referring to FIG. 4, the UE or application server (although exemplified as the AF in the embodiment of FIG. 4, a separate server may request the operation through the AF of the wireless communication system) may change the distribution point to be applied to split computing when the communication state is changed while split computing application is used and change the service quality of the corresponding session.

In operation 401, the SMF may notify the application server that the communication service quality providable to the PDU session has been changed, via the AF. The AF may function as the application server. The Nsmf_PDUSession_Status Notify message for the notification may include the UE identifier and QoS profile(s) information currently providable for the QoS profile(s) to be applied to each distribution point initially requested by the AF.

In operation 402, the application server (or AF) determines the new distribution point to be applied to the split computing application service which is currently in progress and the new QoS profile(s) to be applied to the session corresponding thereto, based on the information about the changed service quality received from the SMF. The new QoS profile(s) information may be transferred through the application service message directly to the UE or may be transferred to the network to request a session change.

Operations 402, 403, 404, and 405 in FIG. 4 may be performed using the messages described in connection with operations 301 to 303 of FIG. 3 except that the AF requests to apply the QoS profile(s) to the session, and no detailed description thereof is given.

In operation 406, the SMF may apply the service quality parameter to the new QoS profile requested by the AF, received from the PCF in operation 405 and perform a session change procedure (PDU session modification) with the UE to change the service quality for the session being used for data transmission of the current split computing service. In the session change procedure, the PDU session ID and the QoS parameters updated according to the service quality change may be exchanged between the SMF and the UE.

In operation 407, the SMF may transmit an Nsmf_PDUSession_Status Notify including the QoS profile(s) supported and the corresponding UE identifier (UE ID) to the PCF to notify the PCF that the session change procedure with the UE has been successfully done. The PCF may use it as a reference in determining, e.g., the session policy to be applied to the session when changing the communication quality in the future.

Operations 408 and 409 are another embodiment for performing a session change through the UE's URSP change as shown in FIG. 3. In operation 408, the PCF transmits a UE configuration update command including the updated URSP to be applied to the changed split computing distribution point to the UE through the AMF (not shown). In operation 409, the UE may apply the updated QoS parameter to be applied to the new distribution point by applying the updated URSP and perform the session change procedure (PDU session modification) requesting the network to change the session.

Figure 5:
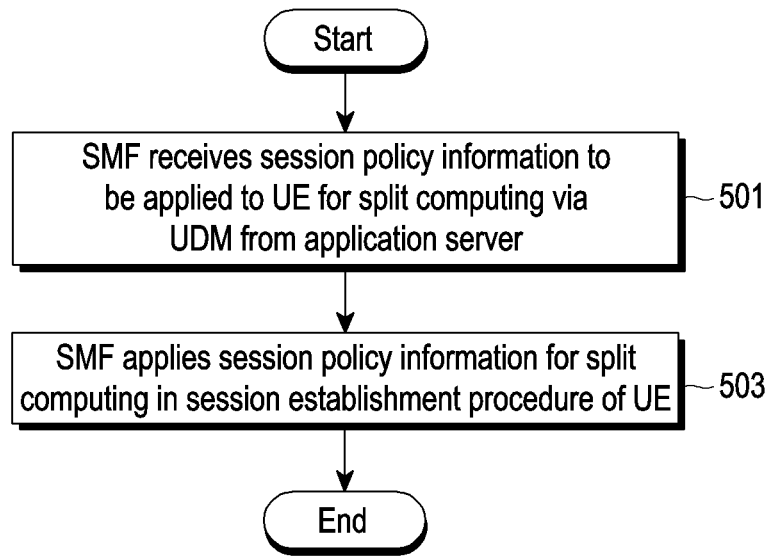
FIG. 5 is a view illustrating a method performed by an SMF for split computing in a wireless communication system according to an embodiment of the disclosure.

FIG. 5 is a view illustrating a method performed by an SMF for split computing in a wireless communication system according to an embodiment of the disclosure.

Referring to FIG. 5, in operation 501, the SMF receives session policy information to be applied to the UE for split computing via the UDM from the application server and, in operation 503, the SMF applies the session policy information for split computing in the UE's session establishment procedure. The session policy information may include the QoS information to be applied to the UE for split computing.

Figure 6:
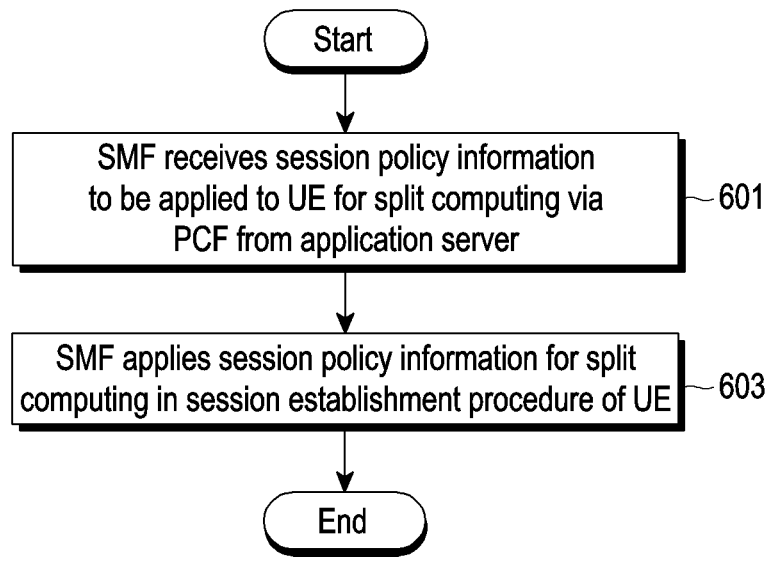
FIG. 6 is a view illustrating another method performed by an SMF for split computing in a wireless communication system according to an embodiment of the disclosure.

FIG. 6 is a view illustrating another method performed by an SMF for split computing in a wireless communication system according to an embodiment of the disclosure.

Referring to FIG. 6, in operation 601, the SMF receives session policy information to be applied to the UE for split computing via the PCF from the application server and, in operation 603, the SMF applies the session policy information for split computing in the UE's session establishment procedure. The session policy information may include the QoS information to be applied to the UE for split computing.

Figure 7:
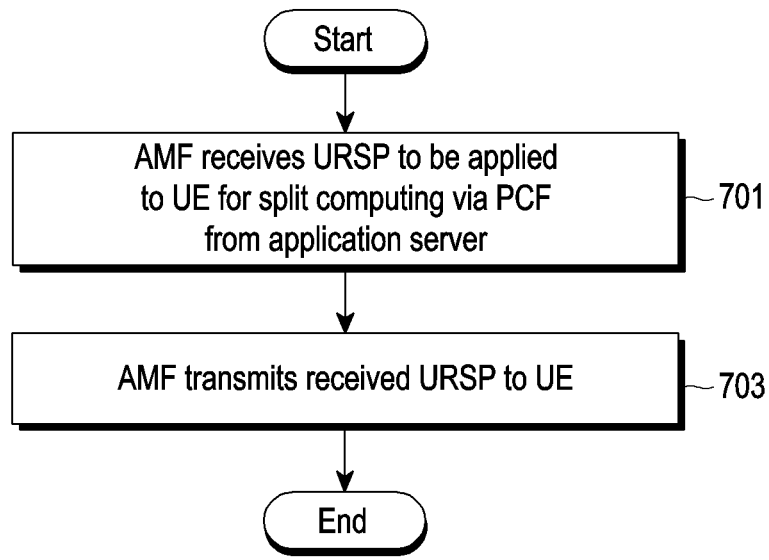
FIG. 7 is a view illustrating a method performed by an AMF for split computing in a wireless communication system according to an embodiment of the disclosure.

FIG. 7 is a view illustrating a method performed by an AMF for split computing in a wireless communication system according to an embodiment of the disclosure.

Referring to FIG. 7, in operation 701, the AMF receives URSP to be applied to the UE for split computing via the PCF from the application server and, in operation 703, the AMF transmits the received URSP. The policy information may include the UE's UE route selection policy (URSP) to which the QoS information has been applied for split computing.

Figure 8:
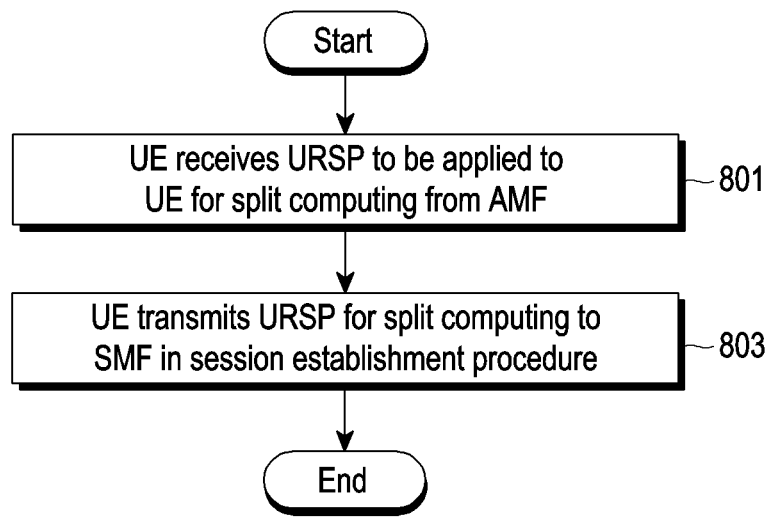
FIG. 8 is a view illustrating a method performed by a UE for split computing in a wireless communication system according to an embodiment of the disclosure.

FIG. 8 is a view illustrating a method performed by a UE for split computing in a wireless communication system according to an embodiment of the disclosure.

Referring to FIG. 8, in operation 801, the UE receives the URSP to be applied to the UE for split computing from the AMF and, in operation 803, the UE transmits the URSP for split computing to the SMF in the session establishment procedure. The policy information may include the UE's URSP to which the QoS information for split computing has been applied.

Figure 9:
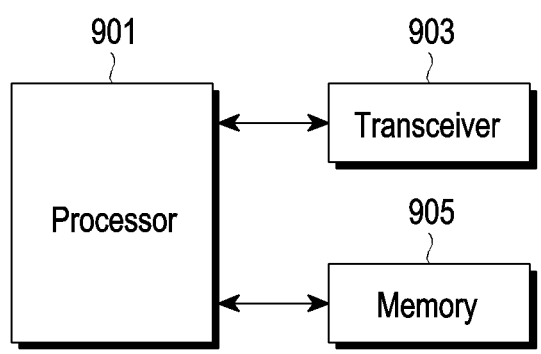
FIG. 9 is a view illustrating a configuration of a network entity in a wireless communication system according to an embodiment of the disclosure.

FIG. 9 is a view illustrating an example of a configuration of a network entity according to an embodiment of the disclosure.

The network entity of FIG. 9 may be one of the UE or the network functions (NFs), such as the SMF, AMF, PCF, UDM, UDR, NEF, and AF, described above in connection with FIGS. 1 to 8.

According to an embodiment of the disclosure, the network entity may include a processor 901 controlling the overall operation of the network entity according to one or a combination of two or more of the embodiments of FIGS. 1 to 8, a transceiver 903 including a transmitter and a receiver, and a memory 905. Without limited thereto, the network entity may include more or less components than those shown in FIG. 9. According to an embodiment of the disclosure, the transceiver 903 may transmit/receive signals to/from at least one of other network entities or a UE. The signals transmitted/received with at least one of the other network entities or the UE may include at least one of control information and data.

Referring to FIG. 9, the processor 901 may control the overall operation of the network entity to perform operations according to one or a combination of two or more of the embodiments of FIGS. 1 to 8 described above. The processor 901, the transceiver 903, and the memory 905 are not necessarily implemented in separate modules but rather as a single chip. The processor 901 and the transceiver 903 may be electrically connected with each other. The processor 901 may be an application processor (AP), a communication processor (CP), a circuit, an application-specific circuit, or at least one processor. The transceiver 903 may include a communication interface for wiredly/wirelessly transmitting/receiving signals to/from another network entity.

According to an embodiment of the disclosure, the memory 905 may store a default program for operating the network entity, application programs, and data, such as configuration information. The memory 905 provides the stored data according to a request of the processor 1201. The memory 905 may include a storage medium, such as ROM, RAM, hard disk, CD-ROM, and DVD, or a combination of storage media. There may be provided a plurality of memories 905. The processor 901 may perform at least one of the above-described embodiments based on a program for performing operations according to at least one of the above-described embodiments stored in the memory 905.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

It should be noted that the above-described configuration views, example views of control/data signal transmission methods, example views of operational procedures, and configuration views are not intended as limiting the scope of the disclosure. In other words, all the components, network entities, or operational steps described in connection with the embodiments should not be construed as essential components to practice the disclosure, and the disclosure may be rather implemented with only some of the components without departing from the gist of the disclosure. The embodiments may be practiced in combination, as necessary. For example, some of the methods proposed herein may be combined to operate the network entity and the UE.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a policy control function (PCF) in a wireless communication system, the method comprising:
   receiving, from an application function (AF), a first message including information about one or more quality of service (QOS) profiles;
   determining, based on the received information, at least one QoS profile to be applied to a protocol data unit (PDU) session of a user equipment (UE); and
   transmitting, to a session management function (SMF), a second message including information about the at least one QoS profile,
   wherein the at least one QoS profile is further applied for split computing between the AF and the UE.

2. The method of claim 1, wherein the at least one QoS profile for the split computing is applied to distribute computing load between the AF and the UE.

3. The method of claim 1, wherein each of the at least one QoS profile further represents a distribution point distributing the computing load between the AF and the UE.

4. The method of claim 1, wherein the one or more QoS profiles are associated with an artificial intelligence (AI)-based application service.

5. A policy control function (PCF) in a wireless communication system, the PCF comprising:
   a transceiver; and
   a processor configured to:
      receive, via the transceiver from an application function (AF), a first message including information about one or more quality of service (QOS) profiles,
      determine, based on the received information, at least one QoS profile to be applied to a protocol data unit (PDU) session of a user equipment (UE), and
      transmit, to a session management function (SMF) via the transceiver, a second message including information about the at least one QoS profile,
   wherein the at least one QoS profile is further applied for split computing between the AF and the UE.

6. The PCF of claim 5, wherein the at least one QoS profile for the split computing is applied to distribute computing load between the AF and the UE.

7. The PCF of claim 5, wherein each of the at least one QoS profile further represents a distribution point distributing the computing load between the AF and the UE.

8. The PCF of claim 5, wherein the one or more QoS profiles are associated with an artificial intelligence (AI)-based application service.

9. A session management function (SMF) in a wireless communication system, the SMF comprising:
   a transceiver; and
   a processor configured to:
      receive, via the transceiver from a policy control function (PCF), information about at least one QoS profile to be applied to a protocol data unit (PDU) session of a user equipment (UE), the at least one QoS profile being based on QoS profile information provided from an application function (AF), and
      transmit, to the UE via a network, QoS related information to be used in a PDU session establishment procedure for the UE, based on the received information,
   wherein the at least one QoS profile is further applied for split computing between the AF and the UE.

10. The SMF of claim 9, wherein the at least one QoS profile for the split computing is applied to distribute computing load between the AF and the UE.

11. The SMF of claim 9, wherein each of the at least one QoS profile further represents a distribution point distributing the computing load between the AF and the UE.

12. The SMF of claim 9, wherein the QoS profile information is associated with an artificial intelligence (AI)-based application service.

13. A user equipment (UE) in a wireless communication system, the UE comprising:
   a transceiver; and
   a processor configured to:
      transmit, to a session management function (SMF) via a network, a protocol data unit (PDU) session establishment request message, and
      receive, via the network from a session management function (SMF), a PDU session establishment response message including QoS related information, the QoS related information being based on QoS profile information provided from an application function (AF), wherein at least one QoS profile is further applied for split computing between the AF and the UE.

14. The UE of claim 13,
wherein the QoS profile information corresponds to at least one QoS profile.

15. The UE of claim 13, wherein the at least one QoS profile for the split computing is applied to distribute computing load between the AF and the UE.

16. The UE of claim 13, wherein each of the at least one QoS profile further represents a distribution point distributing the computing load between the AF and the UE.

17. The UE of claim 13, wherein the QoS profile information is associated with an artificial intelligence (AI)-based application service.

* * * * *